US006853849B1

(12) United States Patent
Tognazzini

(10) Patent No.: US 6,853,849 B1
(45) Date of Patent: Feb. 8, 2005

(54) LOCATION/STATUS-ADDRESSED RADIO/ RADIOTELEPHONE

(75) Inventor: Bruce Tognazzini, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1188 days.

(21) Appl. No.: 08/655,133

(22) Filed: May 30, 1996

(51) Int. Cl.[7] .......................... H04Q 7/20; H04M 3/42
(52) U.S. Cl. ................ 455/457; 455/414.1; 455/456.1; 455/426.1; 340/991
(58) Field of Search .................... 455/456.1, 456.2, 455/456.3, 426, 457, 433, 456, 12.1, 410, 411, 414, 82, 412, 418, 419, 420, 426.1, 126.2, 412.1, 416, 414.1, 414.2, 414.3, 556, 156.2; 342/457, 352, 357; 340/991–995.1

(56) References Cited

U.S. PATENT DOCUMENTS

| | | | | |
|---|---|---|---|---|
| 5,070,329 A | * | 12/1991 | Jasinaki | 340/7.27 |
| 5,081,667 A | * | 1/1992 | Drori et al. | 379/44 |
| 5,218,367 A | * | 6/1993 | Sheffer et al. | 342/457 |
| 5,343,512 A | * | 8/1994 | Wang et al. | 379/59 |
| 5,442,688 A | * | 8/1995 | Katz | 379/156 |
| 5,596,744 A | * | 1/1997 | Dao et al. | 707/10 |
| 5,727,057 A | * | 3/1998 | Emery et al. | 379/211 |
| 5,731,785 A | * | 3/1998 | Lemelson et al. | 342/357 |
| 5,748,148 A | * | 5/1998 | Heiser et al. | 342/457 |
| 5,790,676 A | * | 8/1998 | Ganesan et al. | 380/23 |
| 6,009,323 A | * | 12/1999 | Heffield et al. | 455/414 |

FOREIGN PATENT DOCUMENTS

| | | |
|---|---|---|
| GB | 2217081 | 10/1989 |
| WO | WO 95/24808 | 9/1995 |
| WO | WO 96/05678 | 2/1996 |
| WO | WO 96/07110 | 3/1996 |

* cited by examiner

*Primary Examiner*—Nay Maung
*Assistant Examiner*—Edan Orgad
(74) *Attorney, Agent, or Firm*—Finnegan, Henderson, Farabow, Garrett & Dunner, L.L.P.

(57) ABSTRACT

Point-to-point or point-to-multipoint communications are established based on a database query broadcast to all stations. Stations satisfying the query respond and communications are established with the station(s) responding. The database query is preferably directed to location, status or history of the station being queried. Responding stations may be displayed on a moving map and establishing communications with a responding station can be established by touching an icon of the station on a touch screen display.

19 Claims, 22 Drawing Sheets

DATABASE

| | |
|---|---|
| I. | VEHICLE INFORMATION<br>GLOBALLY UNIQUE ADDRESS:<br>TYPE OF VEHICHLE:<br>COLOR:<br>MAKE:<br>MODEL:<br>LICENSE NUMBER:<br>CURRENT LOCATION:<br>CURRENT ORIENTATION:<br>CURRENT DIRECTION:<br>CURRENT SPEED:<br>CURRENT ACCELERATION: |
| II. | OPTIONAL PERSONAL INFORMATION |
| III. | HISTORY INFORMATION<br>- ROUTE TRAVELLED<br>- TEMPERATURE<br>- DETECTED ICING |

Figure 5

LOCATION/STATUS-ADDRESSED RADIO/RADIOTELEPHONE

BACKGROUND OF THE INVENTION

1. Field of the Invention

The invention relates to communications systems and more particularly to radio or radiotelephone systems in which the call recipient is addressed by either his location or status.

2. Description of Related Art

Telephone systems, both land line and cellular, are known in which a station is identified by a telephone number. An originating user places a call to a recipient station by dialing the telephone number which results in establishment of a connection between the originating station and the recipient station over which users of the telephones at those stations may communicate.

In the area of radio transmission, it is also known to address each station with a unique address.

In the prior art, reverse telephone directories are known for identifying a particular address associated with a telephone number. However, such directories are of use only for fixed locations and cannot be utilized effectively to locate mobile stations or those that are portable, i.e. carried on a person.

Detecting traffic status is currently done by building a network of observers and sensing devices. These networks are cumbersome to administer, and sensing devices, because of their expense, tend to be clustered only around high traffic-problem areas.

Consumers presently rely on commercial radio station traffic reports. These cover only a few major roads/accidents and users must listen to all reports for a large geographic area in order to glean information pertinent to their needs.

Low-power AM transmitters are located in some high traffic problems areas, such as airports. These stations require users to tune their radios to a special frequency (away from the music they may have been enjoying) and typically broadcast either out of date information or just a repeated general information recording.

A feature has been developed that is now appearing in new consumer automobile radar detectors. This system can deliver traffic advisories to all radar-detector-operating cars within a general area. This system, however, is unable to target specific populations, such as all cars north of Page Mill Road traveling south on highway 280. Instead, everyone within a given geography receives the notice. Additionally, cars that are beyond range, but could well use the advisory, are excluded. For example, if highway 280 has been closed because of a spill and will remain so for 2 hours, a driver leaving San Francisco needs to be advised to start off on a different highway. Learning three miles away from the accident, once in radar-detection range, that the highway is closed may be of little use.

Traffic advisories, because of their generalized nature, require giving the same advice/instructions to all vehicles. This limits the ability of traffic advisors to suggest multiple detour routes, instead dumping most or all traffic on a single detour, often resulting in a traffic tie-up almost as severe as the tie-up they are attempting to relieve.

In the area of police work, speeding is currently detected either by police officers directly observing an infraction, with our without radar devices, or by preinstalled remote observation devices, such as cameras or autonomous radar detectors. This results in such spotty enforcement that the police presence has become primarily a deterrent.

Police currently rely solely on visual observation to detect such aberrant driving practices as weaving in and out of traffic while speeding or wandering all over the road due to intoxication.

Police depend on warning sirens and lights, sometimes augmented with a public address system, to communicate to drivers. Drivers, in these cases, have no means of communicating back. Drivers, in rare cases, have been known to talk back to the police by dialing 911 on their radiotelephones. Police also sometimes talk to drivers on CB radios, but, typically, police are unable to establish two-way communications with a potential fugitive. This effectively eliminates the possibility of lowering tensions and opening negotiations, resulting in high-speed chases and resultant death and injury.

Police depend strictly on sirens and lights to warn other drivers during hot pursuit. Since the pursued vehicle may be well ahead of the police car giving chase, and since the perpetrator is unlikely to make use of lights and siren, a great many multiple-car collisions occur during high-speed chases.

Vehicles leaving the scene of a crime can be tracked today only if an officer is in immediate pursuit or if the vehicle is known to contain a transponder device and the identity of the vehicle is known to the police. In other words, a getaway car with no license plate cannot be tracked unless the police arrive quickly.

Typical radio systems today can either broadcast to a wide geographic area or target specific vehicles based on their pre-set identity code. Dispatches cannot be targeted to only those vehicles in a given geographic area.

Currently, automobile occupants are limited in their ability to communicate with the occupants of other vehicles. Certain international signs and signals for happiness and displeasure can be issued, but conversation is only possible, via CB or ham radio, both in use by limited, well-defined populations.

SUMMARY OF THE INVENTION

The present invention provides apparatus, systems, methods and computer program products for overcoming the problems of the prior art set forth above. This is done by permitting radio and telephone stations to be addressed based on their location, their status or their history. Location/status addressing permits a wide variety of functionality to be achieved which was not available in the prior art.

The invention is directed to computer apparatus for establishing communications between a calling station and one or more called stations based on information stored at a called station. Stations can be located in vehicles. Called stations have a memory storing information in a database. A receiver receives a communications request including a query specifying at least one criterion. A comparator compares information stored in the database with the criterion, and a transmitter responds to the communications request when the information stored in the database satisfies the criterion. The apparatus optionally includes a global positioning satellite receiver for storing current location information in the database. A proximity detector provides relative location information about nearby objects based on called station location and status detectors store information about the status of the apparatus in the database. The database may also store information about history of the apparatus. A touch-screen display displays current location information on a moving map display together with information about the location of other vehicles. By touching an icon representing a particular vehicle, a communications link can be opened to the particular vehicle. The computer may also control vehicle functions and an authorized user, such as the police, may preempt control of the vehicle functions over the receiver when the transmitter responds to the communications request. A hands free telephone is installed in the vehicle which the computer activates in response to a proper request.

The invention is also directed to apparatus for establishing communications between a calling station and one or more called stations based on information stored in a database at a called station, a calling station including an input device for specifying a query against information stored in the database, and a transmitter for sending a communications request including the query.

The invention is also directed to a method for communications, by sending a communications request from an originating station which includes a query against information stored at individual stations, receiving a response from only individual stations at which information stored satisfies the query and optionally opening a communications link with individual stations from which a response is received. The query can be against information about location, status or history of individual stations.

The invention is also directed to a system for communicating between an originating station and one or more called stations, including a network for connecting stations; a plurality of stations, at least some of which include a database, a network channel for sending a communications request including a query specifying at least one criterion from the originating station to all stations and for receiving back a response from those stations at which the information stored in the database satisfies the at least one criterion, and a network communications channel for communications between the originating station and those stations at which the information stored in the database satisfies the at least one criterion. The network can be a cellular network.

The invention is also directed to a computer program product including a memory medium, and a computer program stored on the memory medium. The computer program includes instructions for sending a communications request from an originating station to other stations including a query against information stored at the other stations, and instructions for receiving a response from only individual stations at which information stored satisfies the query.

The invention is also directed to a computer program product including a memory medium, and a computer program stored on the memory medium. This computer program includes instructions for establishing communications between a calling station and one or more called stations based on information stored at a called station. The information stored at a called station is location information and the computer program includes instructions for obtaining location information from a plurality of stations and for displaying the location information on a moving map display.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which:

FIG. 5 is an exemplary database which forms part of the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The invention will now be described with reference to the following drawings which set forth the best mode for carrying out the invention.

Figure 1:
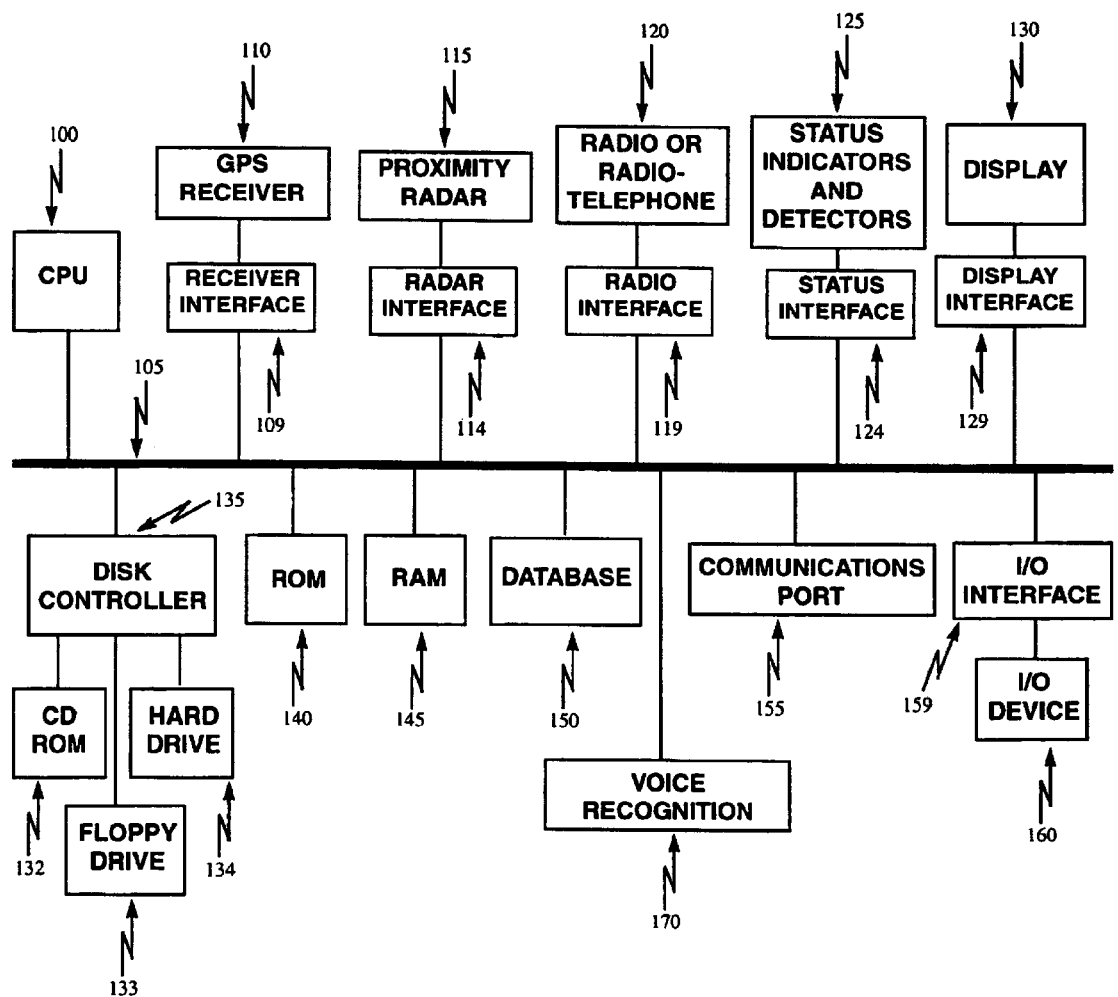
FIG. 1 is a block diagram of apparatus suitable for carrying out the invention.

FIG. 1 shows a block diagram of apparatus suitable for carrying out the invention. It has a bus 105 and a CPU 100 which does all processing associated with information used in accordance with the invention. GPS receiver 110, connected to the bus by receiver interface 109, detects the current location of the GPS receiver antenna. When the invention is built into a vehicle, this is the same as the location of vehicle. When used in a vehicle environment, CPU 100 may serve as a controlling CPU for all vehicle functions.

Proximity radar 115 and radar interface 114 are also connected to the bus. The use of radar is optional but has capabilities that are useful in various circumstances as described more hereinafter.

Radio transceiver or radio telephone 120 are connected via radio interface 119 to the bus. For some embodiments, radio would be preferred whereas in others, radio telephone would be preferred. Which would preferred in a particular is apparent from the context.

Status indicators and detectors 125 are interfaced to the bus over status interface 124. As will be seen hereinafter, information about vehicle status as indicated by various sensors is sometimes utilized in accordance with the invention.

Display 130 is connected to the bus over display interface 129. Display 130 is preferably a color touch screen display.

Optional disk controller 135 manages one or more disk drives which could be CD ROM 132, floppy drive 133 or hard drive 134. These drives are merely symbolic of a number of disc drives which might be accommodated by the computer system. Typically, these would include a floppy disc drive such as 133, a hard disc drive such as 134, and a CD ROM drive indicated by 132. The number and types of drives varies, typically, with different computer configurations.

Bus 105 serves as a main information highway interconnecting the other components of the computer. A CPU 100 is a central processing unit of the system, performing calculations and logic operations required to execute a program. Read only memory 140 and Random Access Memory 145 constitute the main memory of the computer. The disc controller 135 and associated drives are convenient, but optional if other means are available for loading programming and other information into the computing system. Such an alternative might be plugging in preprogrammed ROM into a socket connected to the computer bus.

Database 150 contains information utilized in accordance with the invention as more fully discussed hereinafter. Communications port 155 is optional but would typically constitute an RS 232 slot for connection to external devices. I/O devices 160, such as a mouse or a keyboard are connected to the bus over I/O interface 159. Voice recognition equipment or software 170 permits various audio sounds to be recognized as commands for controlling operations of the devices shown in FIG. 1. The use and operation of the various devices connected to the bus will become apparent from descriptions given hereinafter.

Figure 2:
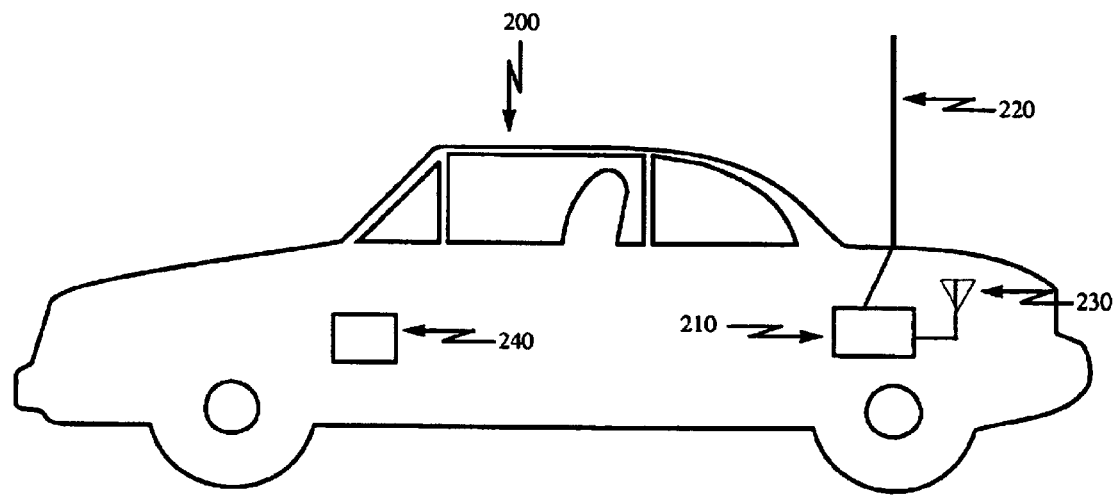
FIG. 2 is an illustration of a vehicle in which the apparatus of FIG. 1 has been mounted in an exemplary installation.

FIG. 2 is an illustration of a vehicle in which the apparatus of FIG. 1 has been mounted in an exemplary installation. Mounted in the rear of vehicle 200 is a housing 210 containing most of the electronics shown in FIG. 1. An antenna 220 serves as an antenna for the radio or radiotelephone communications. It may also be configured to serve as the antenna for the global positioning satellite signals. Auxiliary antenna 230 is shown which is not accessible from the exterior of the car and which serves to transmit and receive information in the event that antenna 220 is damaged. Housing 210 is a tamper resistant housing which contains, inter alia, the CPU 100 shown in FIG. 1. Since CPU 100 serves to control vehicle functions, the removal of container 210 will result in disabling the vehicle for transportation uses. Driver compartment electronics, shown symbolically as 240 in FIG. 2, includes the operator controls, a cellular telephone, an optional hands free telephone microphone and speaker, and touch screen display 130 which also serves to display GPS navigation information, preferably including moving map information.

Figure 3:
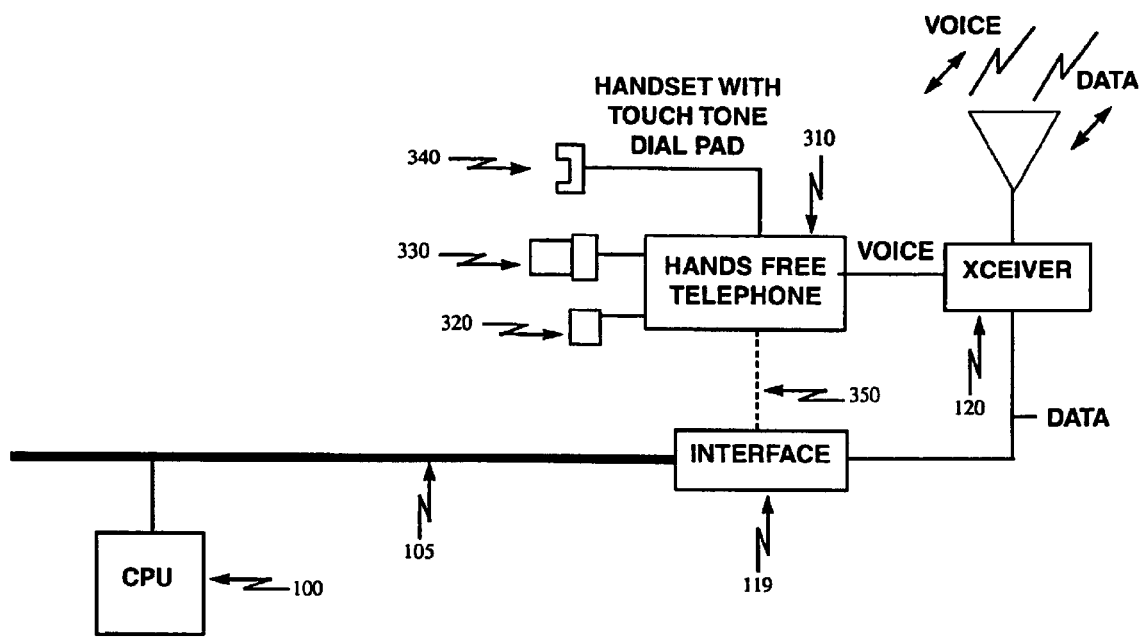
FIG. 3 illustrates voice and data paths in the diagram shown in FIG. 1.

FIG. 3 illustrates voice and data paths in the diagram shown in FIG. 1.

In FIG. 3, transceiver 120 can be either a cellular telephone transceiver or a radio transceiver. As indicated, it can both receive and send voice and data. The voice and data typically follow different paths after being received. The principal voice path is over hands free telephone 310 which receives voice information from and transmits voice information to the user either over microphone 320 and speaker 330, or over integrated handset 340. Typically, in a cellular telephone environment, hand set 340 will include a touch tone dial pad for signalling a central office with the telephone number desired. Hands free telephone 310 can be either analog or digital in its technology. If it is analog, a digital to analog converter may be utilized to convert voice to digital for connection over optional path 350 to the computer bus where voice recognition functions may be undertaken to enable a driver to input information using voice alone.

Figure 4:
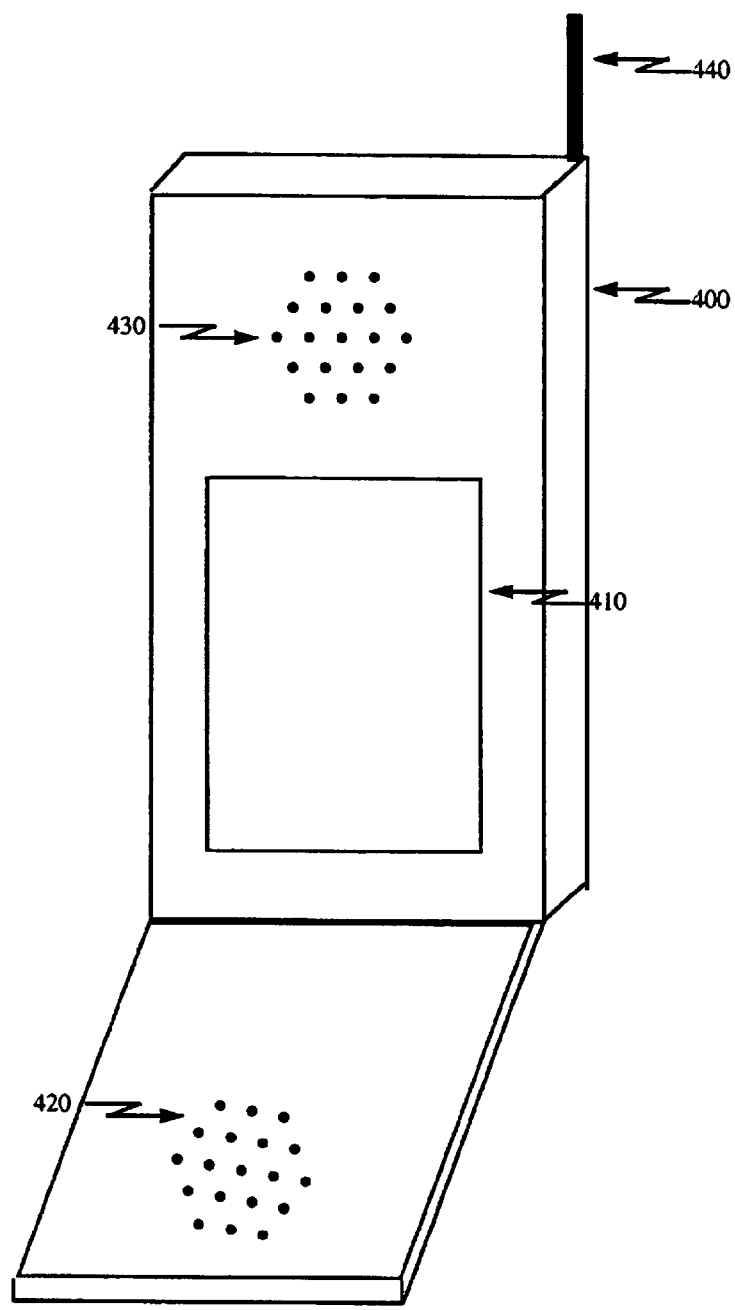
FIG. 4 illustrates a cellular telephone implementation of the hardware shown in FIG. 1.

Rather than being installed in a vehicle, the hardware of FIG. 1 can be installed in a cellular telephone implementation as shown in FIG. 4. FIG. 4 shows a standard flip phone 400 having a display screen 410, microphone 420 and an ear piece 430. Antenna 440 serves to receive and transmit the information required for operation of the invention.

FIG. 5 is an exemplary data base which forms part of the invention. The exemplary data base shown in FIG. 5 partitions the information into three principal categories. The first is vehicle information and includes a globally unique address, a vehicle type, color, make, model and license number of the vehicle. It also includes information about the current status of the vehicle such as its location, orientation, direction, speed and acceleration.

Optional personal information can also be included. This might include name, address, social security number and a telephone number, serving as a synonym for the individual operating the vehicle.

The data base also contains historical information about the vehicle from which can be inferred the route travelled, temperature, and whether or not icing was detected.

As can be seen from FIG. 5, portions of this information are preloaded and fixed. These tend to be unique to the vehicle. Portions of the information are detected or entered by the individual driver.

Figure 6A:
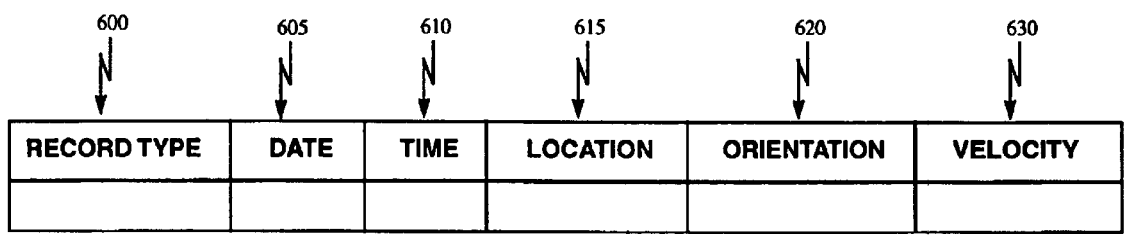
FIG. 6A shows an exemplary format for maintaining vehicle history information in the database of FIG. 5.

FIG. 6A shows an exemplary format for maintaining vehicle history information in the data base of FIG. 5. The record format includes a record type field, 600; a date field 605; a time field 610; a location field 615; an orientation field 620 and a velocity field 630.

Figure 6B:
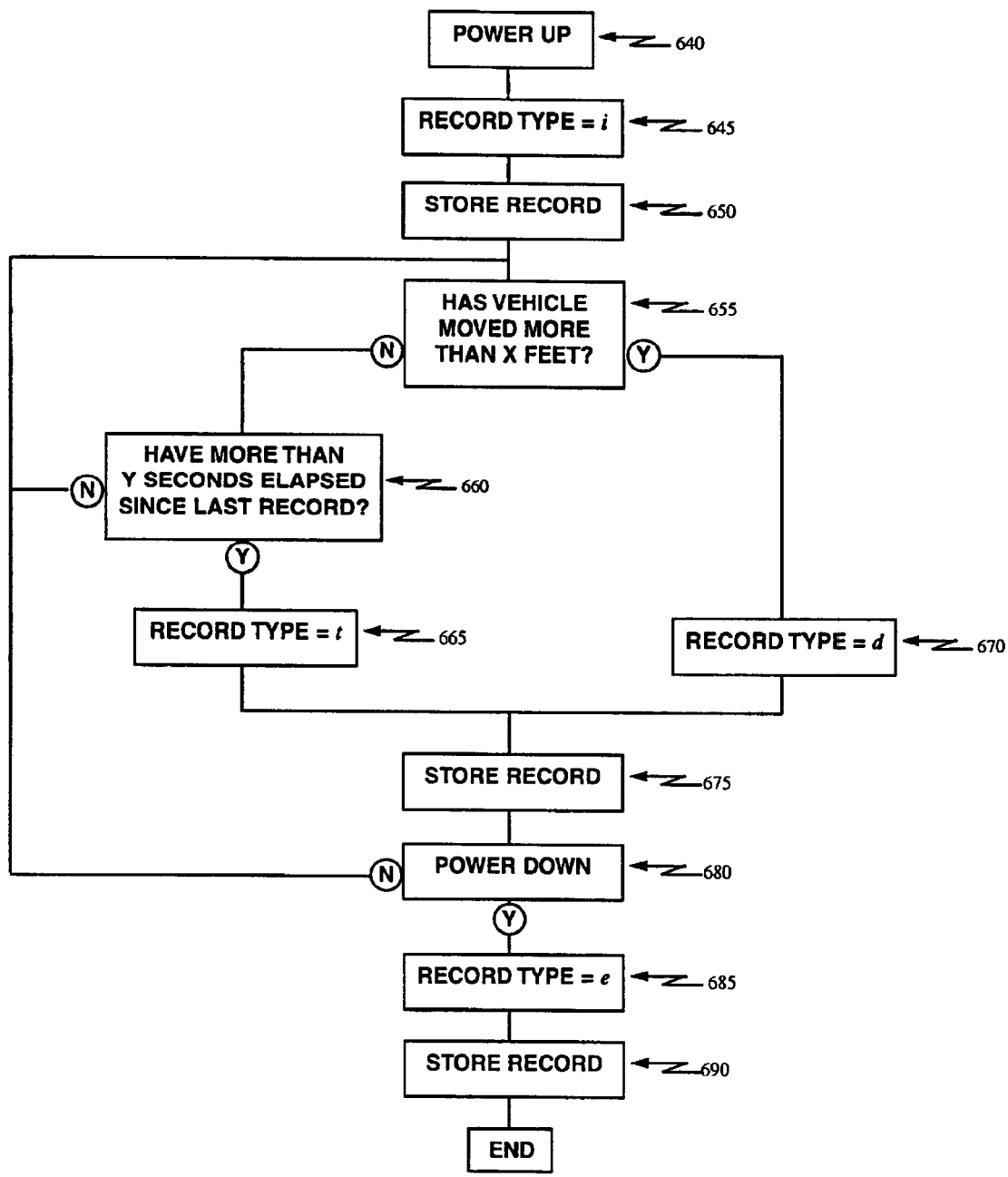
FIG. 6B is a flow chart of how history records are captured.

FIG. 6B is a flow chart of how history records are captured. Upon power up of the vehicle (640), the record type is set to I (645) and the information shown in FIG. 6A is stored for the record (650). Periodically, the GPS receiver is checked to see if the vehicle has moved more than X feet (655), where X is a variable number depending on the resolution of history information desired. If it is not, a check is made to see if more than Y seconds have elapsed since the last record (660) where Y is a variable selected to reflect the desired time resolution for the system. If no more than Y seconds have elapsed since the last record (660-N), the process loops back to before block 655. Otherwise, the record type is set to T (665) and record information is stored (675). If the vehicle has moved more than X feet (655-Y), the record type is set equal to D (670) and the record is stored (675). If the computer detects a power down condition (680), the record type is set equal to E and record information is stored (690) and the process ends. If power down is not underway, the process loops from block 680 to before block 655.

Depending upon the amount of resolution desired in tracking the movements of the vehicle, a large number of history records may be generated. As the records age, it may be desirable to purge certain records. This should be done in a selective manner so as to preserve the maximum amount of information while selectively removing redundancy. One way of doing this would be to look for a series of consecutive records all of type T. These records imply that a vehicle is standing still for an extended period of time without changing location. In a first stage of purging, depending on age of the records, one might eliminate every other record or every third record between a first and a last of consecutive T records. This would allow resolution to degrade but without losing the overall information. T records are somewhat less critical and the important records to maintain are the first and the last records of a series of T records.

As seen in FIG. 6B, D records represent records generated when location changes by a certain amount. Again, depending on resolution, there is much redundancy, particularly for long trips. The same selective purging approach is utilized. Again, the starting and ending locations for movement of the vehicle are considered more important than the intermediate steps. By selectively purging every few records of a consecutive D series, only the granularity of the information available about the path followed by the vehicle during the trip is lost while retaining the essence of the travel locations. When records become very old, it may be desirable to reduce the D records to only the starting and ending locations. I type records and E type records would generally not be selectively edited.

Figure 7:
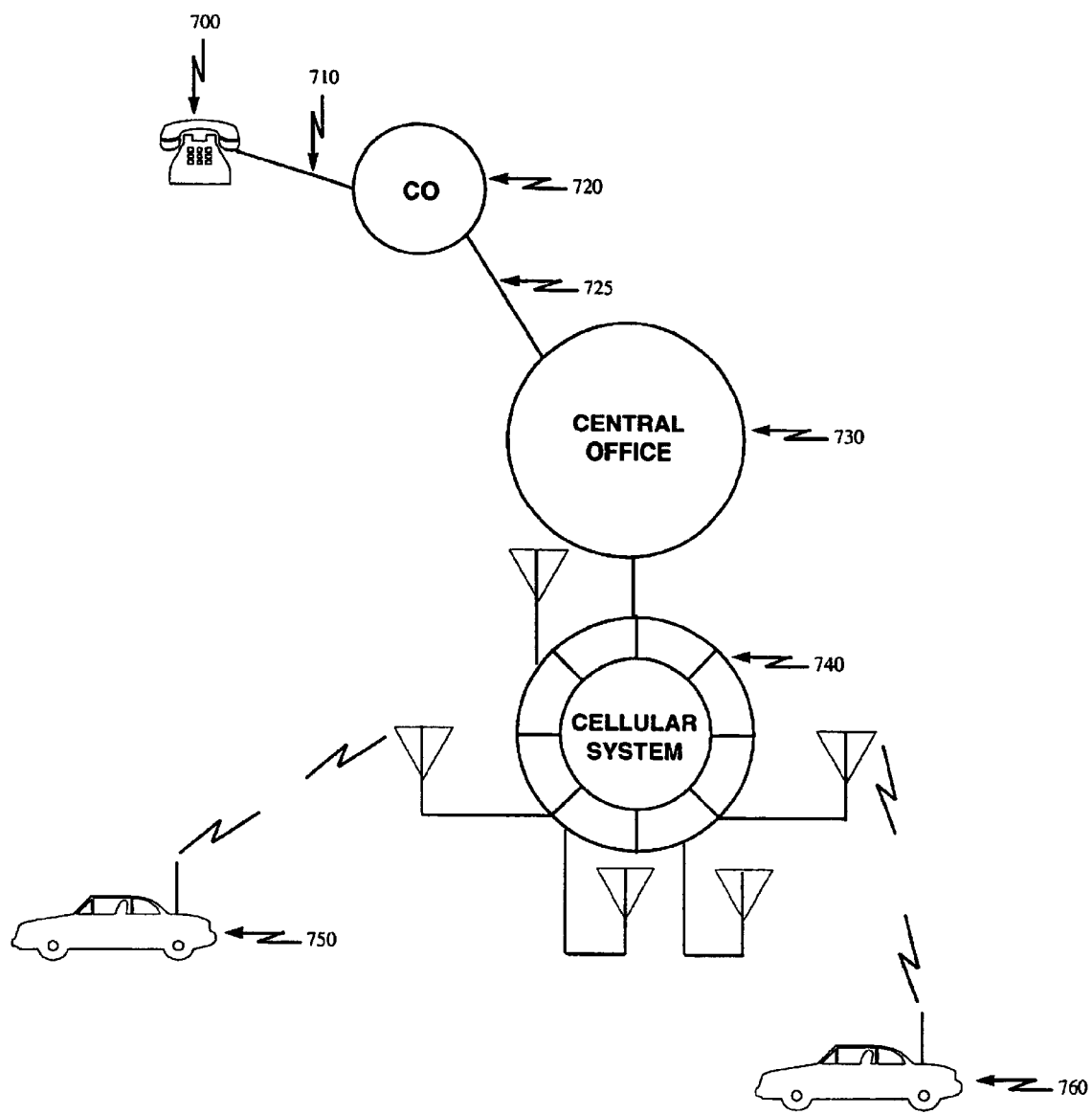
FIG. 7 illustrates placing a call from a single originating station to a single destination station in accordance with the invention.

FIG. 7 illustrates placing a call from a single originating station to a single destination station (one to one) in accordance with the invention. A call may originate from either a fixed station 700 or a cellular station 750. If originating from the fixed station 700, the call will originate over a subscriber line 710 which connects the subscriber 700 to a local central office 720. Another central office 730 may connect over a tandem trunk 725 or the like. Central office 730 connects to a cellular system central 740 which then broadcasts the location, status or history query which serves as an identifier for the desired station. This will determine whether or not the cellular station is active within a cell serviced by cellular system 740. If the cellular station is active within cellular system 740, a response to the local cell will occur from station 760, the called station, and a call will be established between the subscriber 700 and called station 760 over one cell of the cellular system 740. As the destination station 760 moves from out of one cell and into another, standard hand off procedures are performed which permit the conversation to be continued uninterrupted using transmit and receive equipment from an adjacent cell.

If the call originates from cellular station 750, essentially the same process occurs except that the call is originated by one cell of cellular system 740 upon receiving a call request from cellular station 750. The location, status or history of the called station is then transmitted and, if that station is active, it responds and the connection is set up between the two cellular stations.

Figure 8:
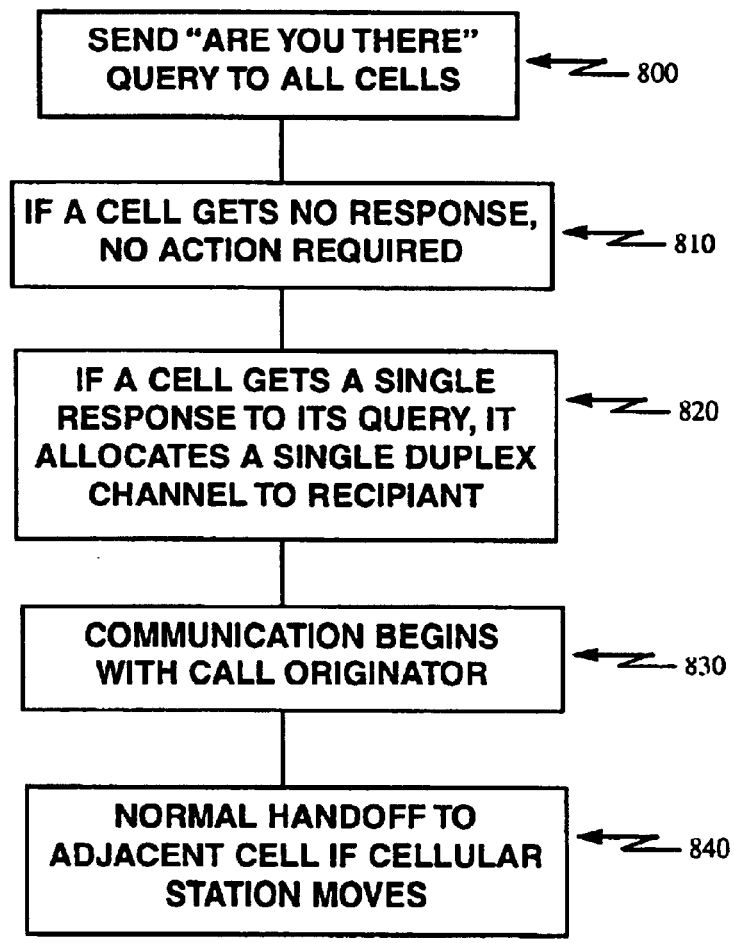
FIG. 8 is a flow chart of call placement shown in FIG. 7.

A flow chart of one to one call completion described in conjunction with FIG. 7 is set forth in FIG. 8. When a call request is received, the cellular system sends an "Are you there" query to all cells (800). The cells broadcast that and if a cell gets no response (810), no action is required. However, if a cell gets a single response to its query, it allocates a single duplex channel to the recipient (820) and communication begins with the call originator (830). Normal handoff to adjacent cells occurs if a cellular station moves (840).

The call set up and completion described in conjunction with FIG. 7 and FIG. 8 follows closely the procedure used for normal cellular call completion. However, the differences between the invention and the prior art cellular techniques are highlighted in FIG. 9. Those differences have to do with addressing. Whereas, in the prior art, cellular system addressing was limited to a single destination device address, that is not the case in accordance with the invention. In accordance with the invention, call origination is based upon the location, status or history of the destination station and each request may have plural responding stations.

Figure 9:
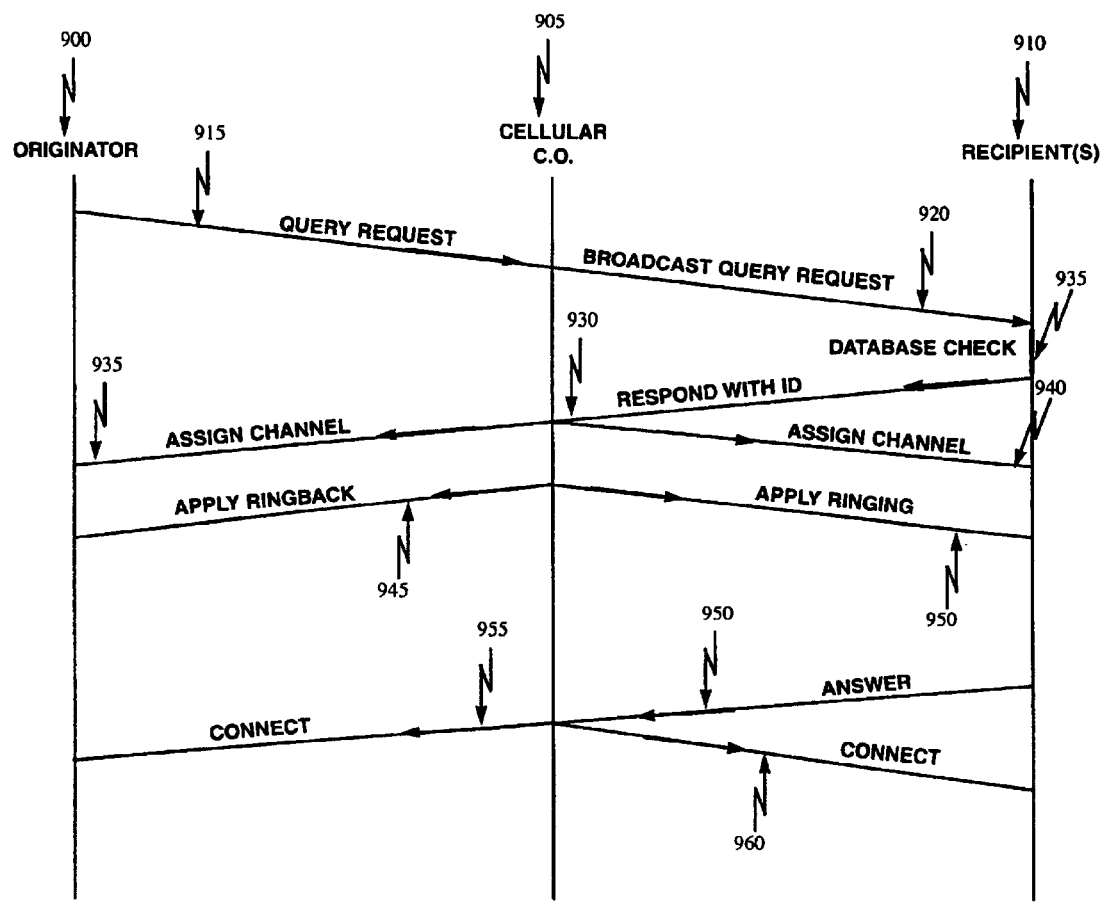
FIG. 9 illustrates process flow between an originating station, a cellular central office, and a recipient station during call establishment.

The case in which only a single station responds to the query is illustrated in FIG. 9. FIG. 9 represents a data flow between an originating station 900, the cellular central office 905 and one or more recipients 910. The originator goes off hook and submits a location or status address query 915. That query takes the form, in this example, of "license=VA ABC1234" meaning I would like to speak with vehicle whose license equals Virginia license ABC1234. That query is broadcast from the cellular central office to all recipients within the cells serviced by the cellular central office (920). Each station within the broadcast area from the cells of the cellular central office 905 checks its data base to see if the query is satisfied by the information stored there. In other words, each station checks its data base to see if the vehicle license number Virginia ABC1234 is entered in the license field of the data base. This occurs at 925. At 930, if a match is found, the station responds with its identification (930). The central office detects a response and assigns an empty communications channel in the cellular spectrum to the originator and recipient of the call (935 and 940). Once the channel is assigned, the central office signals the recipient to apply a ringing signal to the cellular telephone at the destination (950) and applies ringback signal (945) to the originating caller. When the recipient station answers the phone (950), the cellular central office establishes a connection (955 and 960) and communication begins between the originator and the recipient. Thus, by formulating queries to a called station, one or more stations, which satisfy the query, will respond to the call.

Figure 10:
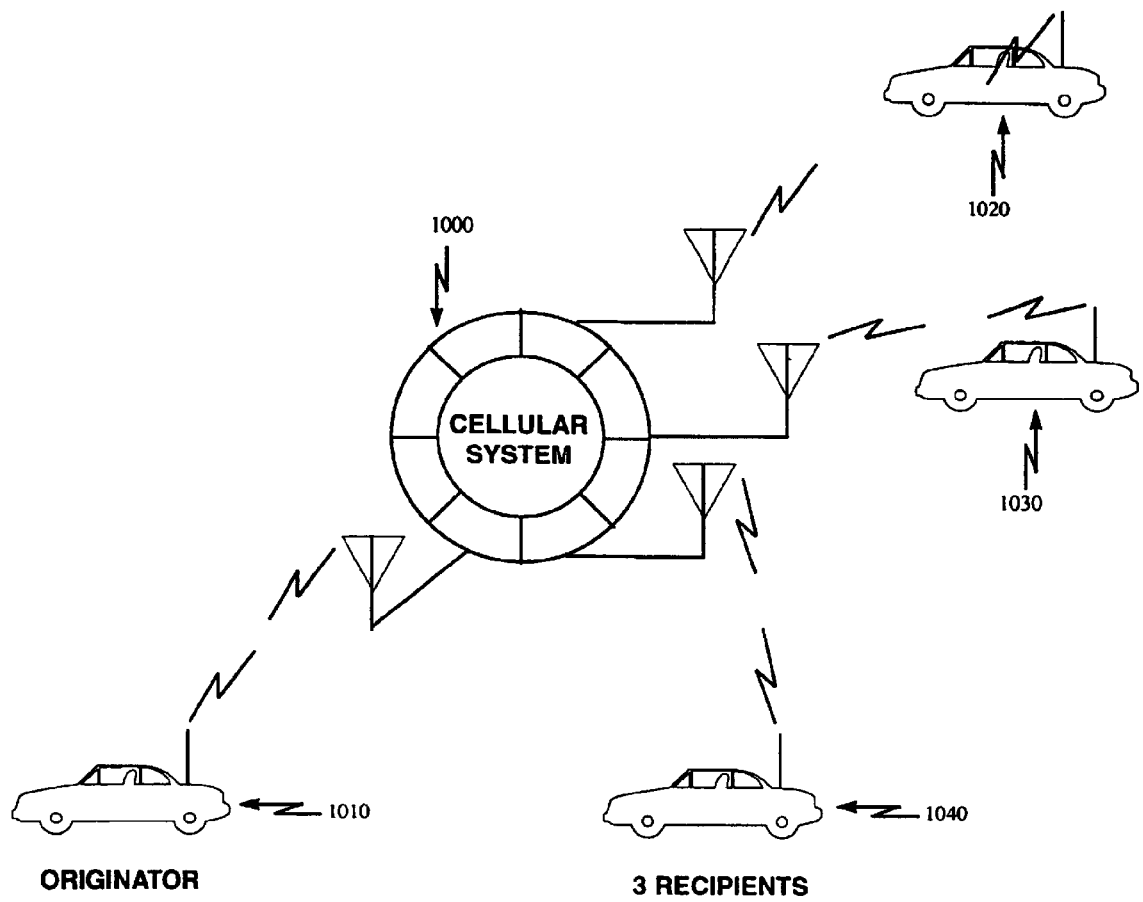
FIG. 10 illustrates placing a call from a single originating station to a plurality of recipient stations over cellular telephone in accordance with the invention.

FIG. 10 illustrates placing a call from a single originating station to a plurality of recipient stations over a cellular telephone network in accordance with the invention. In FIG. 10, station 1010 originates a call over cellular system 1000. Individual stations 1020, 1030 and 1040 each satisfy the query originated by station 1010 and respond to the cellular system 1000 indicating that they satisfy the criteria. How the connection is handled is described more in FIG. 11.

Figure 11:
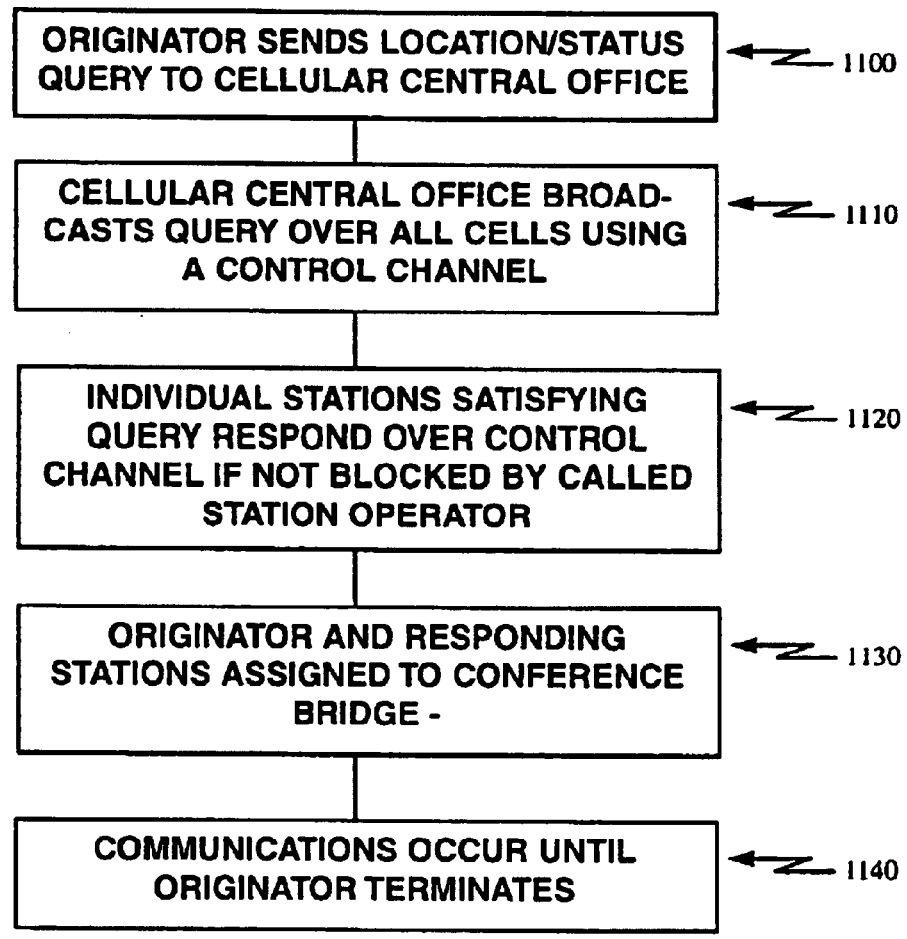
FIG. 11 is a flow chart of call placement shown in FIG. 10 using cellular telephone.

As shown in FIG. 11, an originator sends a location/status query to a cellular control office (1100). The cellular central office broadcasts a query over all cells using a control channel (1110). Individual stations satisfying the query respond over a control channel if the response is not affirmatively blocked by a called station operator (1120). The operator has an option of blocking all status or location calls, except those originating from an official source, as set forth more hereinafter.

A self-organizing communications protocol is designed to assure appropriate query and response even though there may be contention for a particular channel. Such a protocol is preferably a carrier sense multiple access/collision detection (CSMA/CD) protocol.

The originator and responding stations are assigned to a conference bridge by the central office (1130). Conference bridges can be configured a number of ways. For an announcement type of message, the conference bridge is typically established so as to be one way, that is, so that audio information from the originator goes to all users simultaneously but no audio information from the recipients is forwarded to the user. In a second mode, all participants on the conference bridge are assigned full participation rights and each may speak independently as they desire. In the third mode, the conference may begin with a one way announcement and then full participation may be permitted.

Communications continue over the conference (1140) until the originating station terminates the call. In an alternative, the connection will remain established until all participants in the conference have hung up.

Figure 12:
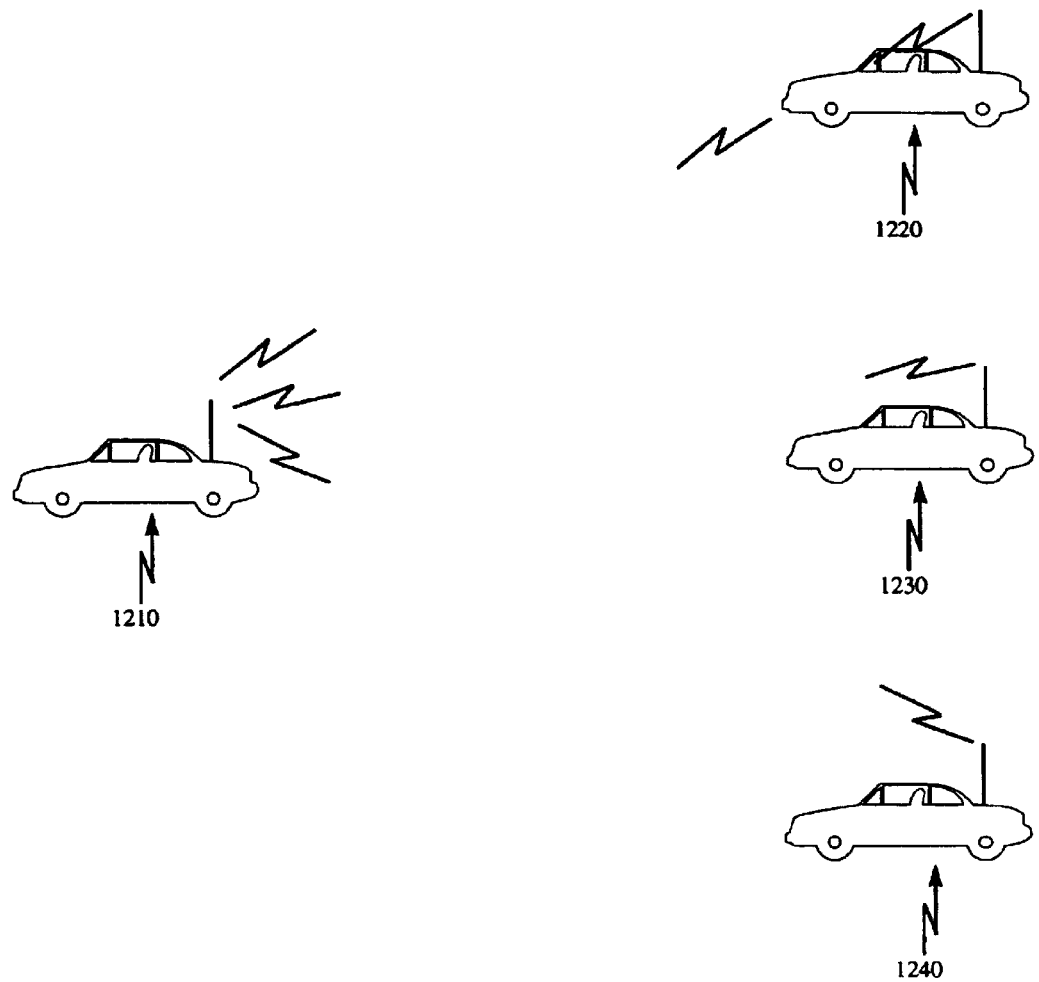
FIG. 12 illustrates placing a call from a single originating station to a plurality of recipient stations over a radio link.

FIG. 12 illustrates placing a call from a single originating station to a plurality of recipient stations over a radio (non-cellular) link. FIG. 12 illustrates this process in which originating station 1210 desires to establish a communication, a station satisfying a certain criterion within his transmission area. These stations, for example, are stations 1220, 1230 and 1240. Other stations, not shown, are within the transmission area but do not satisfy the search criterion sent by station 1210.

In the system shown on FIG. 12, it is convenient to utilize a programmable tone squelch for the different frequencies in use so that only stations for which a communication is intended can hear the communications on a particular RF channel.

Figure 13:
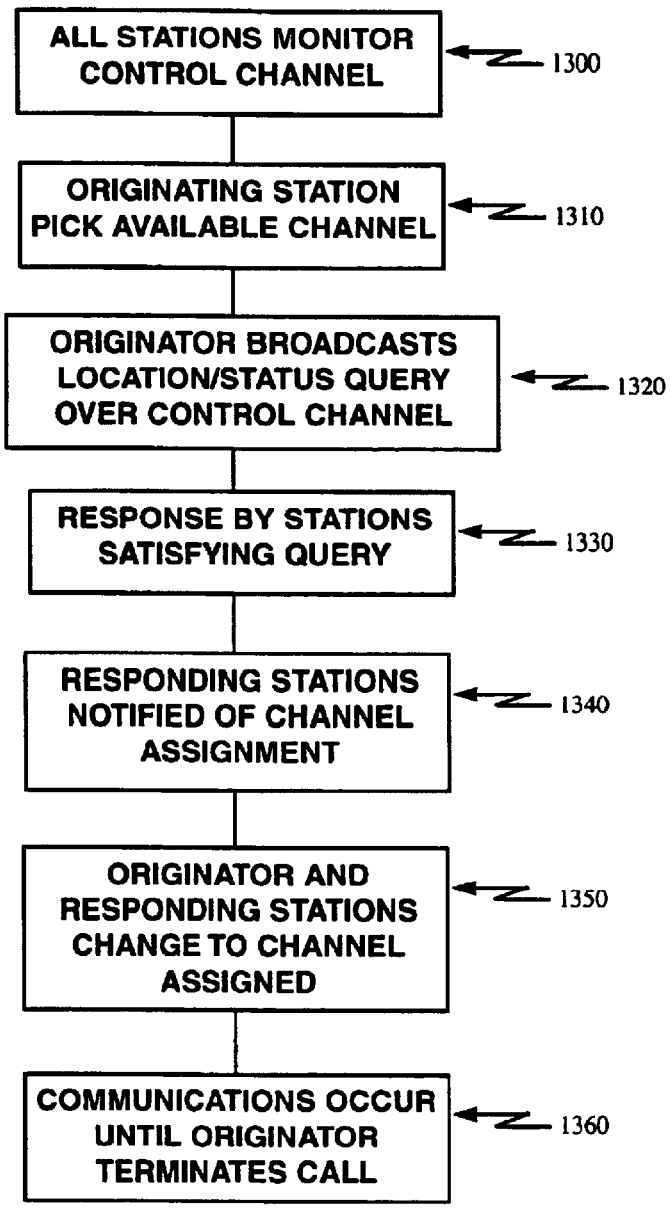
FIG. 13 of call placement shown in FIG. 12.

This process is described more in conjunction with FIG. 13. In FIG. 13, all stations monitor a control channel (1300). An originating station, picks an available channel (1310) and broadcasts location/status query over the control channel (1320). Stations satisfying the query respond over the control channel (1330) and the originating station notifies all responding stations of the channel assignment for communications (1340). The originating and responding stations all change to the assigned channel (1350) and communications occur over that channel until the originating station terminates the call (1360). In an RF implementation, communication protocol such as random access discrete address and the like or a CSMA/CD can be utilized for either the control channel or for ongoing communications. The RF channel selected can either be a vacant RF frequency or a repeater frequency that is not in use. In some embodiments, such as those which might utilize a slotted Aloha protocol, a particular time slot can be assigned for communications on the part of all participating stations. It is clear that the RF communications are preferably VHF communications although HF, CB and the like can be utilized. Packet transmission can be utilized either for the control channel or for communications over the RF link.

Figure 14:
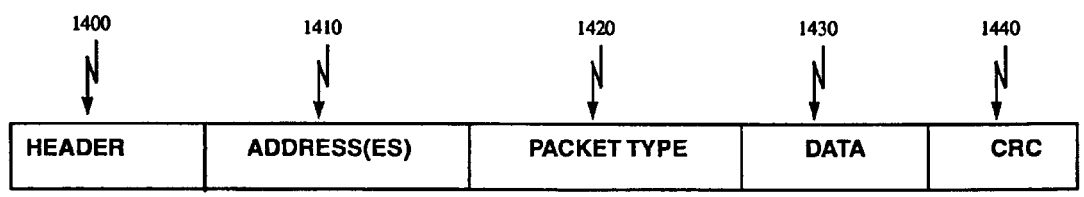
FIG. 14 is an exemplary packet format suitable for use in accordance with the invention.

FIG. 14 is an exemplary packet format suitable for use in accordance with the invention. This exemplary packet format corresponds to packets utilized in CSMA/CD protocols. Each packet has a header 1400, one or more addressees 1410, a packet type 1420 a data field 1430 and a cyclic redundancy code (CRC) 1440. As is known in the art, the header of the packet is utilized to establish synchronization and to prepare receiving equipment to partition the information. In the address block, 1410, the addresses of both the originating and destination stations are preferably included. The address field 1410 may also include a broadcast or a multiple address flag indicating that the packet is directed to more than one station. Packet types can include, for example, a call establish request, a query, indicating that the data field contains a query to be directed against the data base at each local station, a response type packet or a call breakdown request. Clearly, other packet types may be convenient or useful in the handling of the protocol.

If the packet is a query packet, the particular query to be asserted against the data base at each local station is set forth. These can be queries as to location or status.

Figure 15:
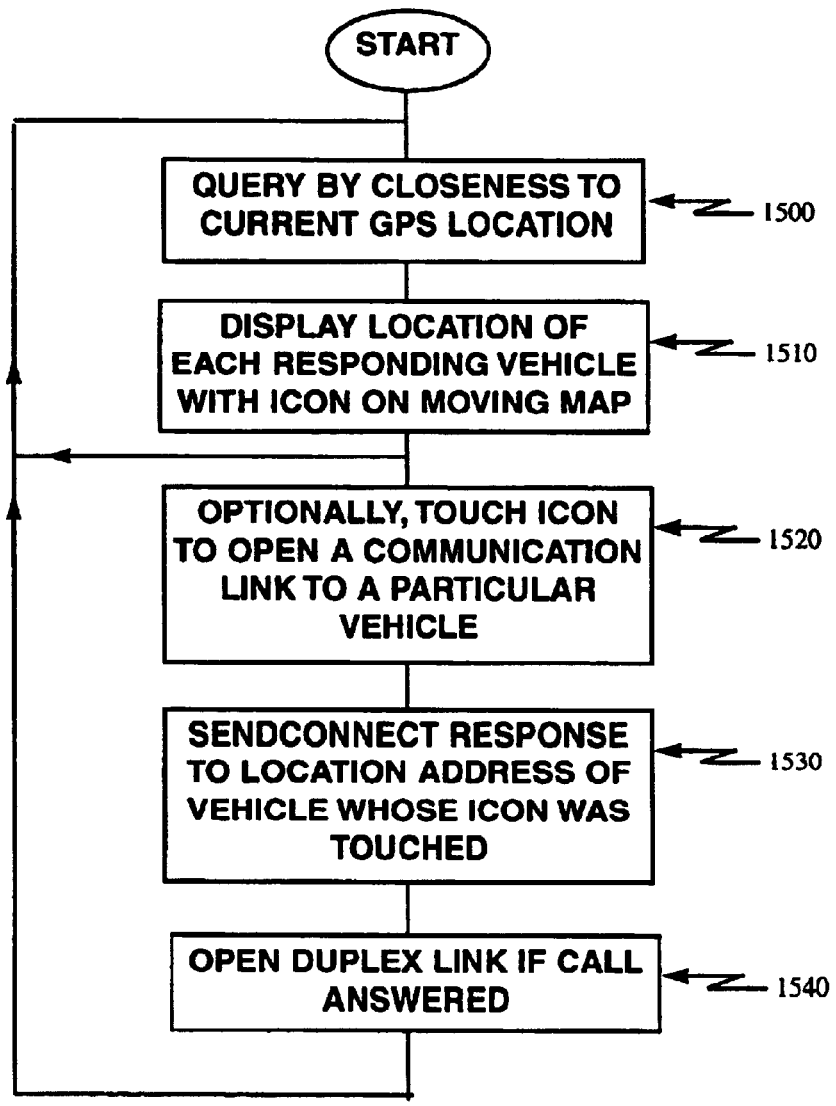
FIG. 15 is a flow chart of a process used to obtain location information about vehicles in an area and to establish communication with one such vehicle.

FIG. 15 is a flow chart of a process used to obtain location information about vehicles in an area and to establish communication with one such vehicle. As indicated above, GPS systems are well known in the art. Those systems, when used in a vehicle, typically incorporate a moving map representation of the environment surrounding the current location of a driver's vehicle and display information about streets and landmarks in that vicinity. As illustrated in FIG. 15, in accordance with the invention, a driver may query other vehicles within transmission range utilizing a closeness to the driver's current GPS location as a selection criterion (1500). At this time, no audio communication is desired, and vehicles in the vicinity would respond by giving their current location to the vehicle posing the query. The location of each of the responding vehicles would be given by the response and an icon depiction of the responding vehicle could be placed on the moving map at its proper GPS location (1510). This process would periodically repeat by looping back to the beginning of block 1500. As an alternative, each vehicle could periodically spontaneously "ping" and inform all vehicles nearby of its location.

It is convenient for vehicles responding with their location to such a query or as part of a spontaneous ping to include color information about the color of the vehicle. With a color screen display, this would permit the icon to be displayed on the screen showing the vehicle position with the appropriate color of the vehicle to permit ready correlation between the icon on the screen and vehicles within the visual range of the driver.

If a driver desired to open a communications link to a particular vehicle shown as an icon on the display screen (1520), the driver could touch the icon and the touch screen display would sense the touch and open a communication link to a particular vehicle. Touching the icon screen causes a connection request to be sent to the location address of the vehicle whose icon was touched (1530) and a duplex link would be opened if the operator of the other vehicle answered the call (1540). Note that blocks 1500 and 1510 essentially solve the problem of vehicles entering a blind intersection, because each vehicle equipped with the location equipment in accordance with the invention would appear on the moving map display of the driver who queried the vehicles. Thus, a blind intersection would be rendered visible on the display screen.

Figure 16:
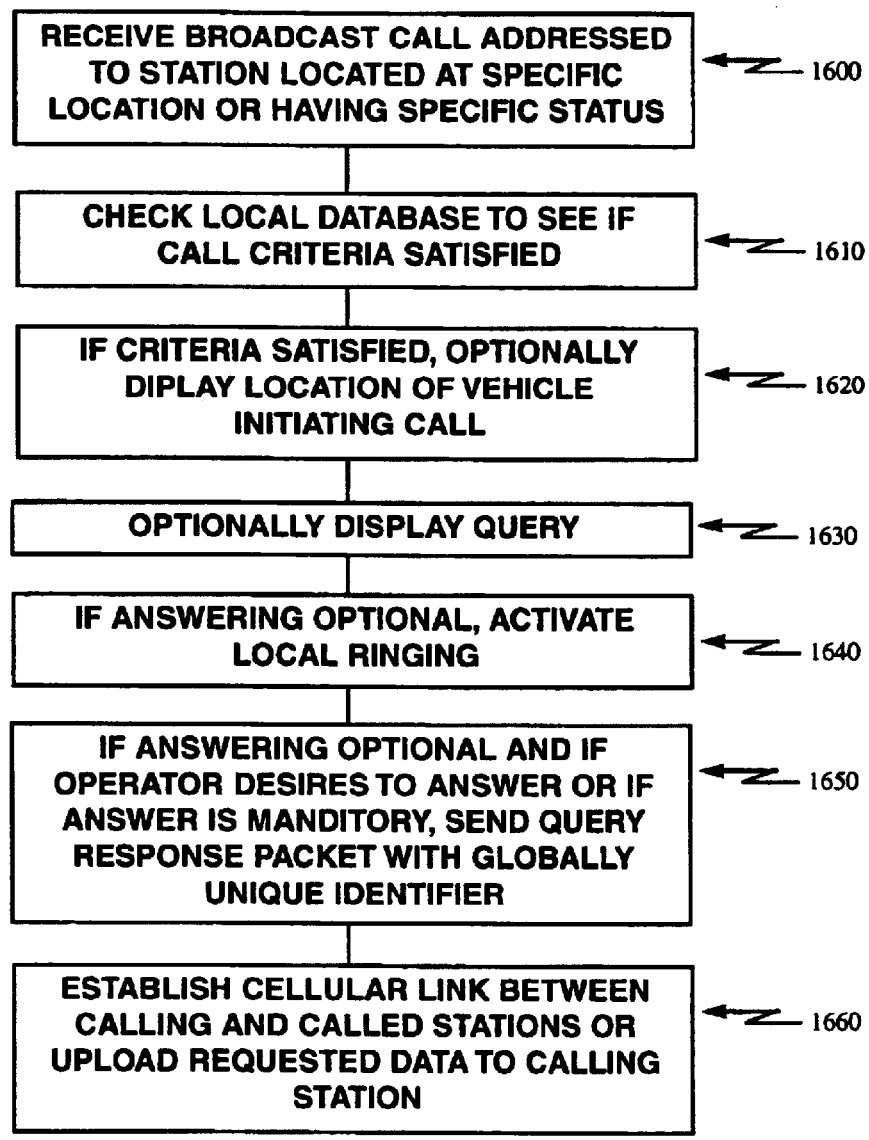
FIG. 16 is a flow chart of a process used to answer location/status addressed calls.

FIG. 16 is a flow chart of a process used to answer location/status addressed calls. A station receiving a broadcast call addressed to stations located at a specific location or having a specific status (1600) would check their local data base to see if the call criteria were satisfied (1610). If the criteria were satisfied, the receiving station would optionally display the location of the vehicle initiating the call. (1620), optionally display the query (1630) and if answering is optional, activate local ringing (1640). If answering were optional and if the operator desired to answer the call or, if answering was mandatory, a query response packet would be sent with at least a globally unique identifier (1615). A cellular link would then be established between calling and called stations or an upload of the requested data could occur to the calling station without an affirmative answer (1660).

An example of a query in which an answer might not be optional would be a query from traffic control officials who desired to gather data about traffic conditions at the location queried. An example of a call for which an answer would be optional, would be one in which a driver going in one direction might request traffic information from a vehicle coming in a different direction. The packet type field of a CSMA/CD packet, described above in conjunction with FIG. 14 can discriminate a large number of call types, the particular one in use being identified with the initial connection request packet. Alternatively, by optionally displaying the query at step 1630, one can infer the intention of the originator and the type of information the originator might be interested in. One might not wish to be bothered by such calls.

Software filters can be utilized to eliminate any annoyance caused by ringing of the telephone in response to certain types of queries to which the user does not wish to respond.

Figure 17:
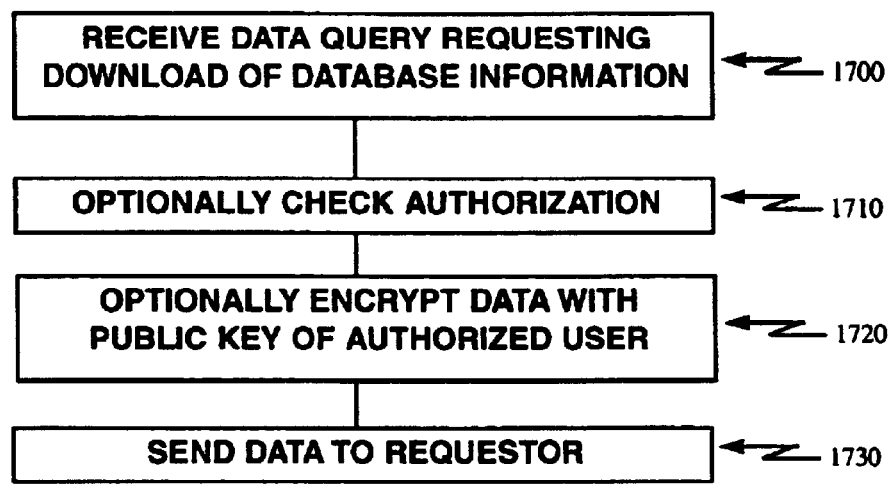
FIG. 17 is a flow chart of a process used to download database information to a requestor.

FIG. 17 is a flow chart of a process used to download data base information to a requester. Typically, authorized requesters would be public service officials. Under such circumstances, a vehicle or hand held unit would receive a data query requesting download of data base information (1700). Optionally, the system would check the authorization of the requesting user (1710) and optionally encrypt data being sent with the public key of an authorized user (1720) and then send the data to the requestor (1730). In a preferred embodiment, there would be a hierarchy of data access authorizations. Only certain users would be authorized to retrieve certain information from another vehicle's data base without the user being aware of it. In the process shown in FIG. 17, the phone wouldn't ring. This, of course, raises privacy issues that are significant. Preferably, a search warrant would be required for the highest levels of access.

Figure 18:
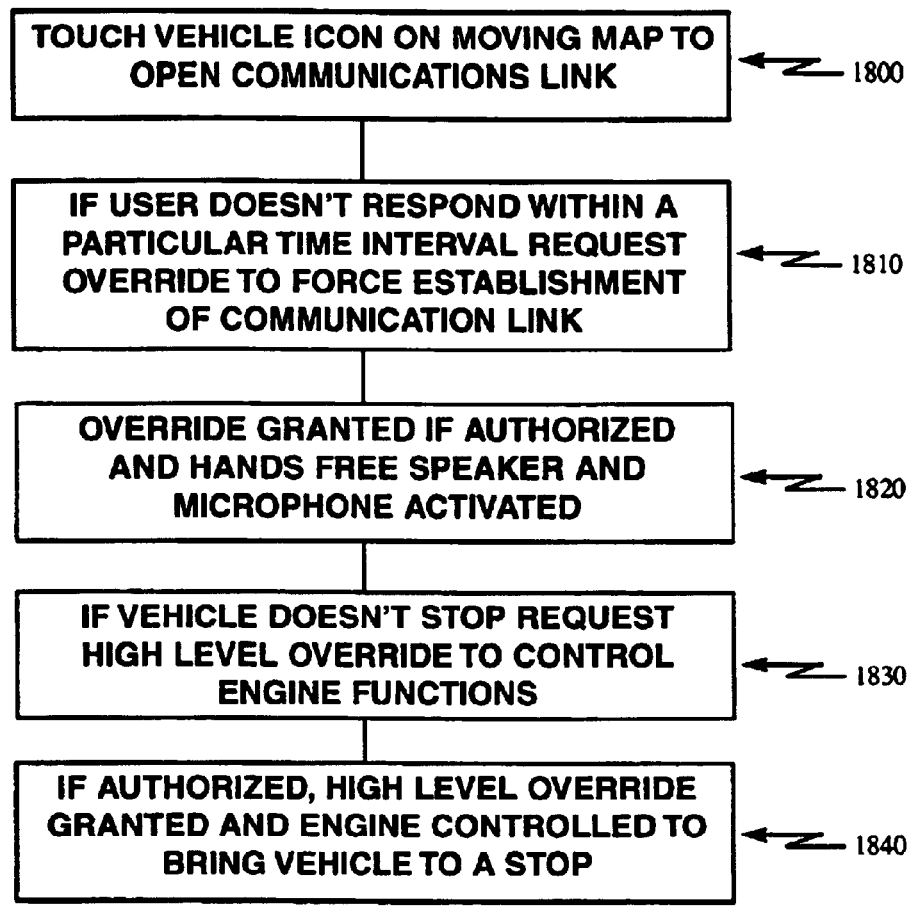
FIG. 18 is a flow chart of an extension of one to one communication for police or official use.

FIG. 18 is flow chart of an extension of one to one communications for police or official use. A police official or other authorized user can open up communications with a vehicle desired by touching the vehicle's icon on a moving map representation (1800). If a user doesn't respond in within a particular time interval, the police official can request override to force the establishment of a communications link (1810). With proper authorization, the override would be granted by the vehicle which is the object of the police attention and a hands free speaker and microphone would be activated (1820). If the occupants of the vehicle choose not to stop in response to a request from a police official, a higher level override could be activated to control engine functions to bring the vehicle to a halt (1830) and (1840).

Figure 19:
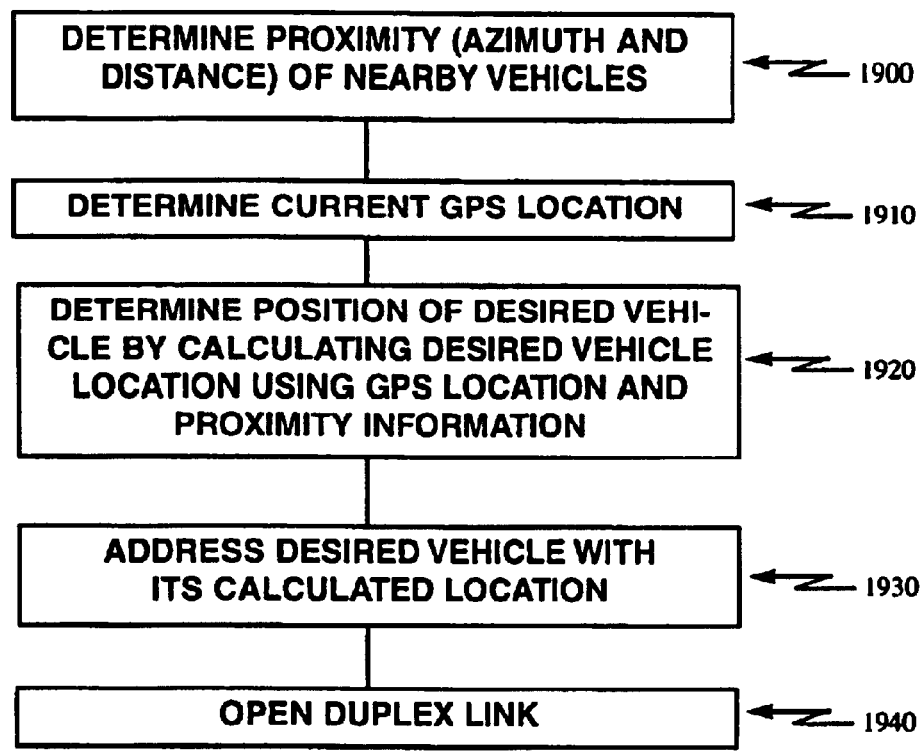
FIG. 19 is a flow chart of a process for location addressing using a proximity detector to determine the address of a station to be called.

FIG. 19 is a flow chart of a process for location addressing using a proximity detector to determine the address of a station to be called. A proximity radar determines the azimuth and distance of nearby vehicles from the current GPS location (1900) of the vehicle on which the proximity radar is located. The current GPS location would be identified (1910) and a calculation undertaken (1920) to determine the position of the desired vehicle, using the GPS location and proximity radar data. The vehicle desiring communication is known. The vehicle identified by proximity radar is identified with the calculated address location of that vehicle (1930) and a duplex link is opened (1940) on an optional or mandatory basis.

Figure 20:
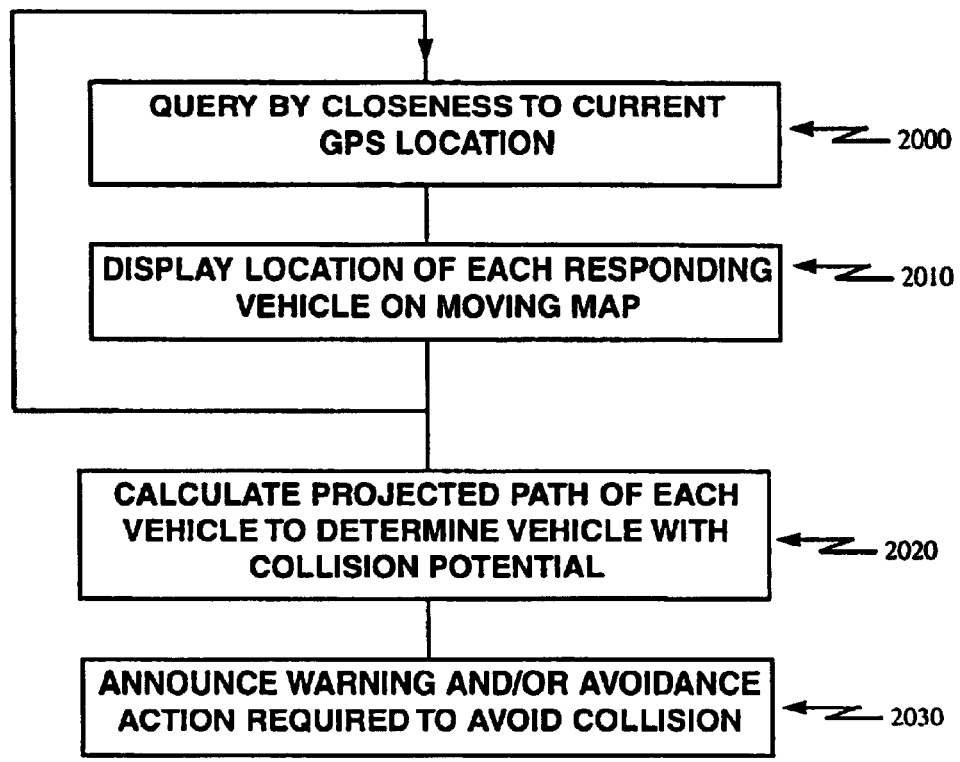
FIG. 20 shows a flow chart of a process for collision avoidance in accordance with the invention.

FIG. 20 shows a flow chart of a process for collision avoidance in accordance with the invention. Vehicles in the vicinity are queried by a closeness criterion to the current GPS location (2000) and the location of each responding vehicle is displayed on the moving map (2010). From the response information, over certain intervals, one can calculate the projected path of each vehicle to determine vehicles with collision potential (2020). If collision potential is detected, one announces a warning and/or avoidance action to be taken to avoid a collision (2030).

In the ongoing process of monitoring the location of other vehicles in the vicinity and detecting a potential for a collision, one may optionally automatically activate a link to a vehicle which poses a threat. This would be automatically activated for a brief interval in response to the driver or other passenger yelling out a warning at a volume level in excess of that in the vehicle prior to the warning.

Figure 21:
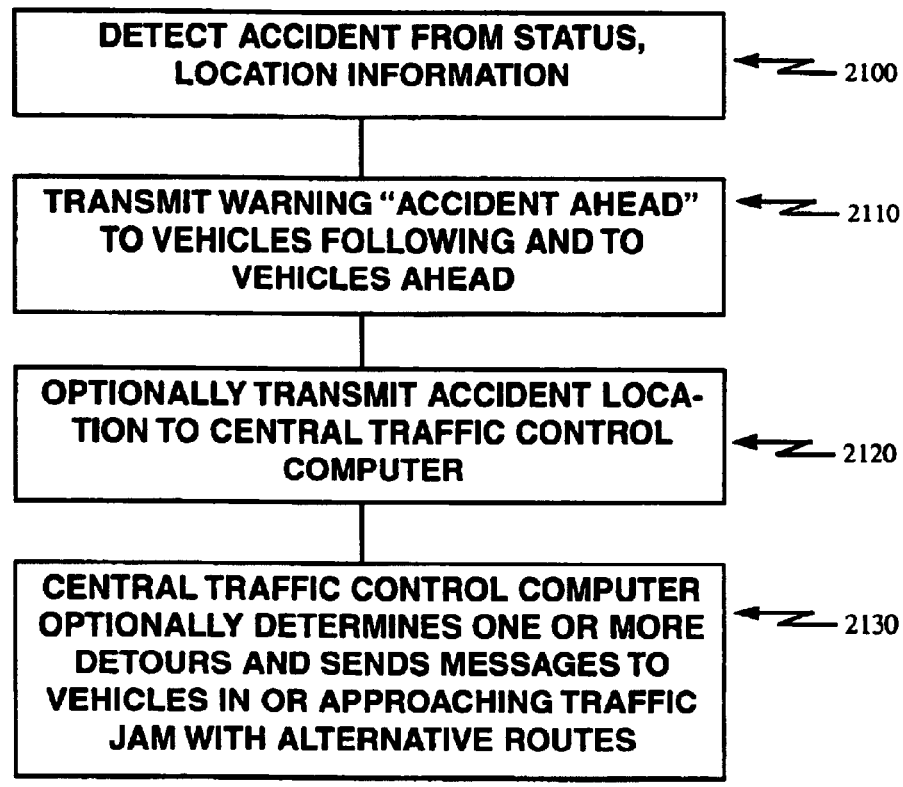
FIG. 21 is a flow chart of a process for communicating accident information and for rerouting traffic.

FIG. 21 is flow chart of a process for communicating accident information and for rerouting traffic. A vehicle detects its internal status from status sensors and location information contained within the data base (2100). When an analysis of that data indicates that an accident has occurred, the vehicle transmits a warning "accident ahead" to vehicles approaching the accident scene from ahead and behind (2110). Optionally, the vehicle may also transmit accident location to a central traffic control computer (2110) and/or forward the information to emergency vehicle dispatch for dispatch of police and/or rescue vehicles, depending upon the status identified in the data base. The central traffic control computer could optionally determine one or more alternate routes and send messages to vehicles in or approaching a traffic jam associated with the accident to direct them to alternate routes.

Using the invention, traffic status can be determined automatically by traffic officials by reading information about the current status of a plurality of vehicles within a particular location by addressing those vehicles by location and by downloading their information into their computers. This permits traffic officials to render timely traffic advisories based on real time information. In the area of police work, police can identify radical behavior occurring within a particular area by location addressing of vehicles in the area or by querying the history fields of the data bases to identify vehicles which had been in an area.

If police officials desired to communicate with suspects, police could open up a communications channel with the vehicle, addressing the vehicle, by location, color, license plate, or any number of other criteria. Police could also issue blanket warnings to other vehicles that an emergency required the police use of the highway.

Police could track a vehicle fleeing the scene of a crime by querying the history section of the data base to find those vehicles which had been located at the scene of a crime within a previous interval of time.

In accordance with the invention, vehicle to vehicle communications can be established as needed.

The invention can also be utilized to trace stolen vehicles or communications equipment. By querying the data base, by license plate, or by global ID, the location of a piece of communication equipment or a stolen vehicle can be determined. Even if the thief has disabled the main transmitting antenna, an auxiliary transmitting antenna enables the police to continue their location efforts.

The ability to locate a user by status or location, instead of just by telephone number greatly facilitates communications. For example, if a doctor were needed, or an ambulance were needed, a broadcast query requesting a status for a vehicle occupant who was an MD or by requesting communications with a vehicle whose status was ambulance, could result in immediate help which might otherwise be delayed or denied. Current car computers are "aware" of road conditions in some senses such as icing, and use that knowledge to guide steering and breaking operations. That data could be utilized as a status input to this invention to indicate where icy conditions existed, thus providing either direct warnings to vehicles in the vicinity or providing the information to a central traffic control computer for generalized warnings.

Using voice recognition equipment, it would be easy to place a call to "the car on my immediate left" using the current GPS location and proximity radar to identify the distance of the car on the immediate left. That car could be location addressed to initiate communications.

When vehicles are travelling through fog or other conditions that reduce visibility, speed information can be communicated to vehicles in front or behind so that a faster vehicle does not suddenly overcome a slower vehicle and crash into its rear end. In the case of fog or reduced visibility, a traffic control computer could set up a speed synchronization zone in which vehicles entering the zone would receive speed data from the vehicle immediately ahead and transmit the speed data to the car immediately behind. Vocal warnings could also be transmitted on an area wide basis.

In accordance with the invention, communication with police and rescue vehicles are enhanced by enabling dispatchers to locate police, fire, rescue and other official personnel closest to the scene of an accident and fitting a particular profile to dispatch appropriate resources or to provide the quickest response to an accident. The same solution could be adopted for an other dispatch service such as courier, taxi, plumbing repair or the like. This would increase the efficiency of the dispatched service and lower their operating costs.

Individual drivers could specify what classes of drivers they would receive calls from for casual communications. For example, a truck driver might wish to limit reception of location/status calls to only other truck drivers.

There has thus been described new techniques for communication which permit location and status addressing which enable a variety of new functionality to be achieved and significant benefits to be accrued over the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for establishing communications between a calling station and one or more called stations based on information stored at a called station, at least one called station comprising:
   a. a memory storing information in a database;
   b. a receiver for receiving a communications request including a query specifying at least one criterion for searching said database;
   c. a comparator for comparing information stored in said database with said at least one criterion; and
   d. a transmitter for responding to said communications request only when said information stored in said database satisfies said at least one criterion.

2. The apparatus of claim 1, further comprising:
   a global positioning satellite receiver for storing current location information in said database.

3. The apparatus of claim 2, in which said communications request includes at least one criterion based on location of said called station with respect to calling station.

4. The apparatus of claim 2, further comprising:
   a proximity detector for providing relative location information about nearby objects based on apparatus location, and a computing device for calculating location information independent of said apparatus location using location information provided by said proximity detector and information provided by said global positioning satellite receiver.

5. The apparatus of claim 2 further comprising a touch-screen display which displays current location information in a moving map display.

6. The apparatus of claim 1, further comprising: at least one status detector for storing information about the status of said apparatus in said database.

7. The apparatus of claim 6, in which said communication request includes at least one criterion based on status.

8. The apparatus of claim 1, in which said database stores information about history of said apparatus.

9. The apparatus of claim 8, in which said communications request includes at least one criterion based on history.

10. Apparatus for establishing communications between a calling station and one or more called stations based on information stored in a database at a called station, a calling station comprising:
   a. an input device for specifying a query for searching information stored in said database at one or more called stations; and
   b. a transmitter for broadcasting a communications request including said query; and
   c. a receiver for receiving a response from one or more called stations having information in said database which satisfies said query.

11. The apparatus of claim 10, further comprising:
   a global positioning satellite receiver for storing current location information.

12. The apparatus of claim 11 further comprising a touch-screen display which displays current location information in a moving map display.

13. The apparatus of claim 10 further comprising:
   a receiver for receiving a response from at least one station having a database containing information which satisfies said query, said response including information about the location of said at least one station,
   a global positioning satellite receiver for storing location of said apparatus information,
   a touch-screen display which displays location of said apparatus information in a moving map display and also information about the location of said at least one station.

14. The apparatus of claim 13, in which said touch screen display initiates a communications request when a location on said touch screen display displaying information about the location of said at least one station is touched.

15. Apparatus for establishing communications between a calling station and one or more called stations based on information stored at a called station, at least one of said one or more called stations comprising:
   a. a computer connected to a bus;
   b. a memory connected to said bus, storing information in a database;
   c. a receiver connected to said bus for receiving a communications request including a query specifying at least one criterion for searching said database; and
   d. a transmitter connected to said bus,
   in which said computer is configured for comparing information stored in said database with said at least one criterion, and for responding to said communications request when said information stored in said database satisfies said at least one criterion.

16. The apparatus of claim 15 installed in a vehicle in which said computer controls vehicle functions and in which an authorized user may preempt control of said vehicle functions over said receiver when said transmitter responds to said communications request.

17. The apparatus of claim 15 installed in a vehicle having a hands free telephone in which said computer activates said hands free telephone under control of a request received over said receiver when said transmitter responds to said communications request.

18. A system for communicating between an originating station and one or more called stations, comprising:
   a. a network for connecting stations;
   b. a plurality of stations, at least some of which include a database;
   c. a network channel for sending a communications request including a query specifying at least one criterion from said originating station to all stations and for receiving back a response from those stations at which said information stored in said database satisfies said at least one criterion; and
   d. a network communications channel for communications between said originating station and those stations at which said information stored in said database satisfies said at least one criterion.

19. The system of claim 18 in which said network is a cellular network.

* * * * *